US005647937A

United States Patent [19]

Ronai

[11] Patent Number: 5,647,937

[45] Date of Patent: Jul. 15, 1997

[54] TEXTILE MANUFACTURING APPARATUS AND METHOD

[75] Inventor: Anton Ronai, Miami, Fla.

[73] Assignee: Monica Ronai, Rio de Janeiro, Brazil

[21] Appl. No.: 352,376

[22] Filed: Dec. 8, 1994

[51] Int. Cl.[6] ................................ B32B 3/10; B32B 31/00

[52] U.S. Cl. ............................ 156/253; 156/269; 428/133; 428/141

[58] Field of Search ..................................... 156/253, 269, 156/290, 63, 91, 92, 324; 428/133, 52, 141; 493/350, 390

[56] References Cited

U.S. PATENT DOCUMENTS

| | | | |
|---|---|---|---|
| 1,324,144 | 12/1919 | Cone . | |
| 3,650,881 | 3/1972 | Giannone, Sr. | 428/133 |
| 3,741,079 | 6/1973 | Bossons et al. | 156/253 |
| 3,793,129 | 2/1974 | Doggart et al. . | |
| 3,793,791 | 2/1974 | Wootten . | |
| 3,793,928 | 2/1974 | Wootten . | |
| 3,846,218 | 11/1974 | Wootten . | |
| 3,923,575 | 12/1975 | Wootten . | |
| 3,925,136 | 12/1975 | Wakeman . | |
| 3,953,634 | 4/1976 | Wooten . | |
| 3,968,287 | 7/1976 | Balk | 156/263 |
| 4,152,302 | 5/1979 | Nonnenmann et al. . | |

*Primary Examiner*—Daniel Stemmer
*Attorney, Agent, or Firm*—Kuhn and Muller

[57] ABSTRACT

A textile manufacturing apparatus to be used to manufacture a sequined textured fabric including a first and a second material film, portions of the second material film protruding through the first material films, the manufacturing apparatus being structured to cut an array of geometric shapes into a dual layer sheet formed by the first and second material films. The geometric shaped cutouts define a plurality of geometrically shaped members and a plurality of geometrically shaped apertures. Further, the manufacturing apparatus is structured to push the geometrically shaped members into a raised orientation above an upper surface of the dual layer sheet, the geometrically shaped members of the second material film protruding through the geometrically shaped apertures of the first material film. The apparatus is further structured to stagger the first material film relative to the second material film so as to space the geometrically shaped members of each material film from one another in order to form the sequined, textured fabric. Finally, a backing material layer is added to secure the first and second material films in their staggered orientation. The step ensures that the overall attractive appearance of the fabric 11 is maintained and that the fabric 11 will not easily tear or unravel during use.

1 Claim, 3 Drawing Sheets

TEXTILE MANUFACTURING APPARATUS AND METHOD

BACKGROUND OF THE INVENTION

1. Field of the Invention

The present invention relates to a textile manufacturing apparatus utilized to manufacture a sequined, textured fabric having an attractive and uniform exterior appearance and being substantially secure in its construction, in a substantially rapid and cost-effective manner.

2. Description of the Related Art

When manufacturing a sequined fabric, the intricate manufacturing required can often be quite difficult and time-consuming, thereby making the fabric quite expensive. Specifically, the attractive nature of sequined fabrics is primarily due to the three-dimensional appearance of the various sequined elements disposed along the fabric's surface. With most such fabrics, each individual sequined element must be directly secured to an underlying fabric, a process that can be quite difficult given the number of sequins implemented in substantially close proximity from one another. Also, in manufacturing similar types of fabrics such as that disclosed in the patent to Giannone, Sr. (U.S. Pat. No. 3,650,881), reflective material films are utilized to provide the sequining effect. These existing textiles, however, can be quite limited in their functionality, primarily due to the ease in which they become unraveled or separated, and furthermore, are quite difficult to construct. In fact, conventional methods of constructing such fabrics incorporate manual inlaying of various material layers, a process that can be quite expensive due to its labor intensive requirements.

Accordingly, there is a substantial need for an improved sequined, textured fabric, which can be effectively utilized in a multitude of differing applications, and an apparatus and method which can make such a fabric in a rapid and cost-effective manner. The apparatus and method of the present invention are designed specifically to provide quantities of an attractive and highly usable sequined, texture fabric at increased speeds and reduced costs than was previously possible for the production of sequined fabrics.

SUMMARY OF THE INVENTION

The present invention relates to a textile manufacturing apparatus which will be utilized to manufacture a sequined, textured fabric of the type which includes first and second material films, portions of the second material film protruding through the first material film to achieve the attractive sequined, textured appearance.

Included as part of the textile manufacturing apparatus are cutting means. Specifically, the cutting means are structured in such a manner as to receive a dual layer sheet, which includes the first and second material films disposed in overlying relation with one another, therethrough. Upon passage of the dual layer sheet through the cutting means, the cutting means will substantially cutout an array of geometric shapes into the dual layer sheet. Specifically, the array of geometric shapes are defined by a plurality of geometrically shaped members and a plurality of geometrically shaped apertures formed in the first and second material films. The plurality of geometrically shaped members, which will remain at least partially secured to the respective first and second material films of the dual layer sheet, will define the geometrically shaped apertures.

In addition to the cutting means, the manufacturing apparatus also includes cutout raising means. The cutout raising means are specifically structured to push the geometrically shaped members in both the first and second material films of the dual layer sheet above an upper surface of the dual layer sheet. Accordingly, all of the geometrically shaped members will be disposed in a substantially raised orientation with the geometrically shaped members of the second material film extending through the geometrically shaped apertures of the first material film.

Additionally, the apparatus of the present invention includes stagger means. The stagger means are structured to contact the second material film of the dual layer sheet in such a manner as to slide the second material film relative to the first material film. By sliding this second material film relative to the first material film, the raised, geometrically shaped members of the first material film will be positioned in a staggered, spaced orientation relative to the raised geometrically shaped members of the second material film, thereby providing the fabric with a fuller three-dimensional appearance with each individual geometrically shaped member being visible from the upper surface of the dual layer sheet.

In accordance with the above-referenced apparatus, the method of forming the sequined, textured fabric includes the steps of overlying a first and second material film atop one another to form a dual layer sheet, cutting a plurality of geometrically shaped cutouts into the dual layer sheet in order to define the plurality of geometrically shaped members and plurality of geometrically shaped apertures, pushing the geometrically shaped members from a lower surface of the dual layer sheet into a raised position above an upper surface of the dual layer sheet, and pulling the second material film relative to the first material film so as to stagger the material films and the geometrically shaped members thereof relative to one another. Finally, the method will included the step o securing a backing material layer to the dual layer sheet so as to maintain the dual layer sheet properly and securely oriented.

It is an object of the present invention to provide a sequined, textured fabric which will be structured in a highly usable form capable of being formulated into a variety of articles.

It is an additional object of the present invention to provide a sequined, textured fabric which is substantially durable and will not easily tear, run/shift, or become unraveled during utilization.

Another object of the present invention is to provide an apparatus for the manufacture of a sequined, textured fabric which will produce the fabric in bulk at a substantially rapid manufacturing rate.

Yet another object of the present invention is to provide a textile manufacturing apparatus which will produce a sequined, textured fabric at a relatively low cost and relatively rapid rate.

An additional object of the present invention is to provide a method of manufacturing a sequined, textured fabric which eliminates the substantially labor intensive steps generally required to manufacture similar type fabrics.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
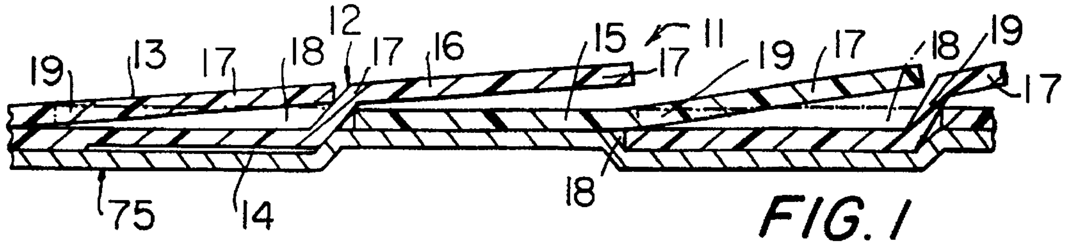
FIG. 1 is a cross-sectional view of the sequined textured fabric of the present invention.
Figure 2:
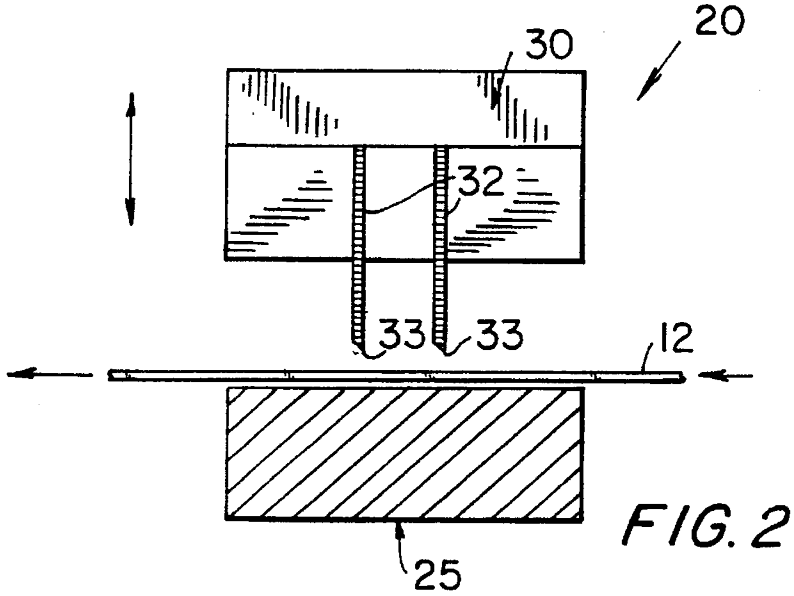
FIG. 2 is a perspective view of the first embodiment of the cutting means of the present invention.
Figure 3:
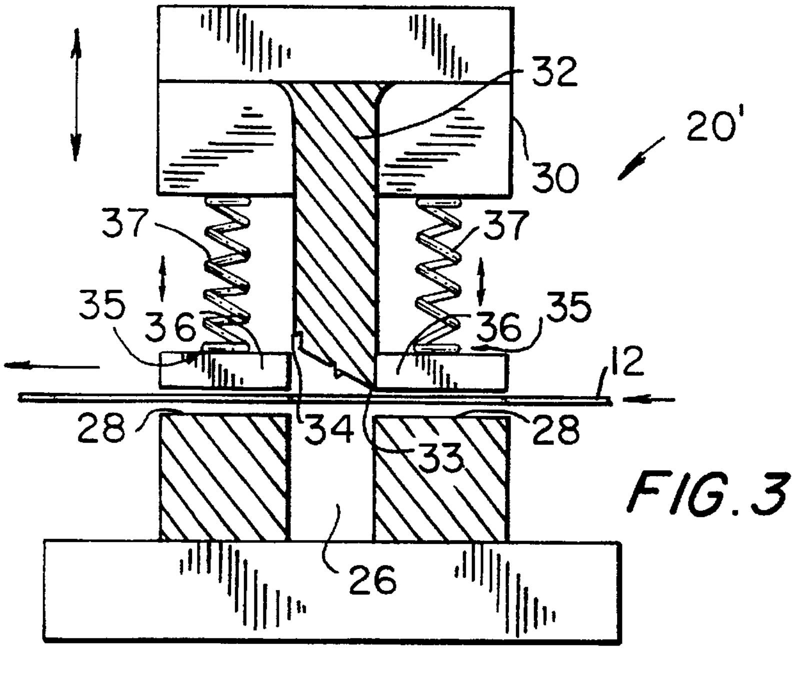
FIG. 3 is a perspective view of a second embodiment of the cutting means of the present invention.
Figure 4:
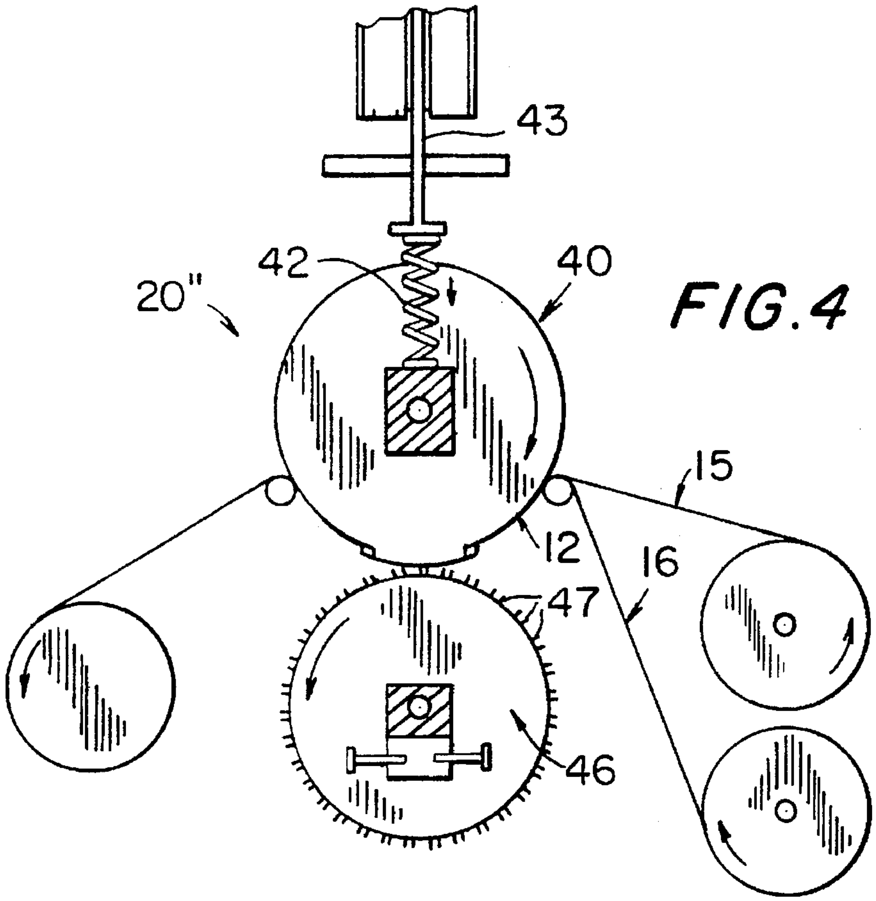
FIG. 4 is a third embodiment of the cutting means of the present invention.
Figure 5:
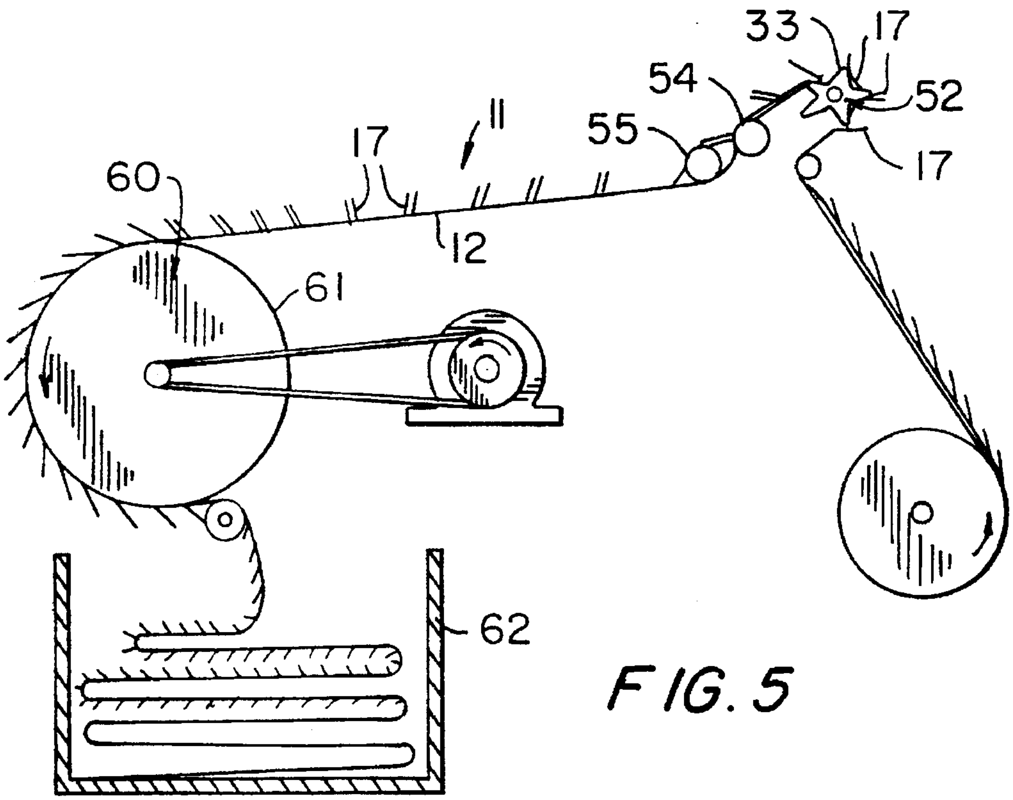
FIG. 5 is a side view illustrating the cutout raising means and stagger means of the present invention.
Figure 6:
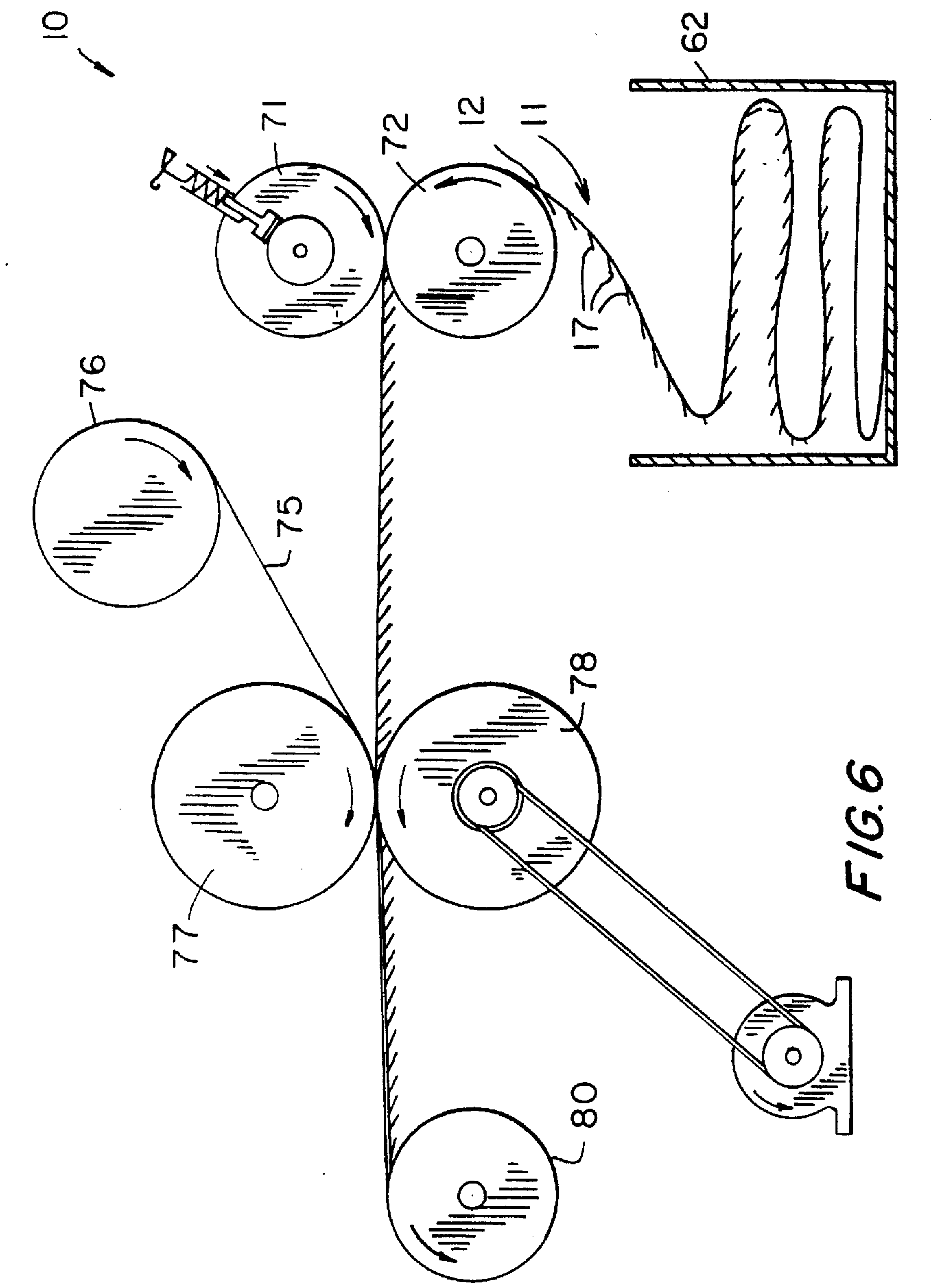
FIG. 6 is a side view of the preferred embodiment of the backing layer applicator means of the present invention.

Shown throughout the figures, the present invention is directed towards a textile manufacturing apparatus, generally indicated as 10. This apparatus will be utilized to produce a sequined, textured fabric 11 which includes primarily a dual layer sheet 12. This dual layer sheet 12 will be formed from a first and a second material film layers 15 and 16, each of which is preferably a reflective laminate type of material such as a flexible plastic laminate. To form the dual layer sheet 12, the first material film 15 is positioned in contacting, overlying position atop an upper surface of the second material film 16. Included within the first and second material film layers 15 and 16 is an array of geometrically shaped cutouts. Specifically, the geometrically shaped cutouts will include a plurality of geometrically shaped members 17. These geometrically shaped members 17 are secured to the respective material films 15 and 16 by a material lip 19, and a number of geometrically shaped apertures 18 within the material films 15 and 16. In order to provide the sequined, textured appearance to the fabric 11, the geometrically shaped members 17 of the second material film 16 will extend through the geometrically shaped apertures of the first material film 15. Additionally, to maximize the sequined appearance the geometrically shaped members 17 of the second material film 16 will be spaced from the geometrically shaped members 17 of the first material film 15, which correspond the geometrically shaped apertures 18 through which the geometrically shaped members 17 of the second material film 16 pass. As such, there is a staggered, sequined type appearance with the geometrically shaped members 17 of both material films 15 and 16 covering the upper surface 13 of the dual layer sheets 12. Further, in order to ensure that the structural integrity of the fabric 11 is maintained during use, the fabric 11 will also preferably include a backing material layer 75 secured to a lower surface 14 of the dual layer sheet 12. This backing material layer 75 will function to securely maintain the first and second material films 15 and 16 in a proper orientation to maintain the full sequined appearance on the upper surface 13 of the dual layer sheet 12, and also making the fabric 11 easier to utilize in construction of various products such as clothing. Specifically, when the material films 15 and 16 are originally interlocked they are disposed in an optimal, attractive orientation. When actually used, however, such as to make clothing or other decorative articles, the manipulations involved in constructing the articles and during its normal use tend to unravel the fabric 11. Utilizing the backing material layer 75, unraveling and shifting of the fabric 11 composition is prevented.

Turning to the manufacturing apparatus 10, it will include cutting means 20 structured and disposed to receive the dual layer sheet 12 and to substantially cutout the array of geometric shapes into the dual layer sheet 12 as it passes therethrough. Accordingly, the cutting means will form the plurality of geometrically shaped members 17 and plurality of geometrically shaped apertures 18 in both the first and second material films 15 and 16. Further, the cutting means 20 will cut out the geometrically shaped members 17 in such a manner as to leave the corresponding material lip 19 through which the geometrically shaped members 17 are secured to the respective material films 15 and 16. Turning to a first embodiment of the cutting means 20, it will include a base panel 25 whereover the dual layer sheet 12 will pass during cutting. Positioned in confronting relation atop the base panel 25 will be a cutter panel 30. This cutter panel 30 is specifically structured to be positionable in an engaged orientation in close relation with the base panel 25, and a retracted orientation in spaced apart relation from the base panel 25. In the preferred embodiment, the cutter panel 30 will move towards the base panel 25 and into the engaged orientation through pistons, pulleys, cams, or like mechanisms. Alternatively, however, the base panel 25 or both panel will move in order to position the cutter means 20 in the engaged and retracted orientations. Included with the cutter panel 30 is at least one perforator segment 32 extending towards the base panel 25. In the preferred embodiment, a plurality of the perforator segments 32 are positioned so as to form the array of geometrically shaped cutouts. The array may be formed utilizing only a small number of perforator segments 32 which are rapid repositioned over the dual layer sheet 12 in order to form the entire array, can consist of a large number of perforator segments 32 to form the completed array over a large surface area of the dual layer sheet 12, or can preferably include one or two rows of the perforator segments 32 positioned so as to progressively form the array of geometric shaped cutouts as the dual layer sheet 12 moves thereunder.

In order to form the geometrically shaped members 17, in the material films 15 and 16, each of the perforator segments 32 will include a cutting end 33. This cutting end 33 will be specifically structured to formulate the desired geometric shape, such as a circle or strip, while not cutting through the material layer films 15 and 16 at the material lip 19 portion which secures the geometrically shaped members 17 to the material films 15 and 16. Further, the perforator segments 32, will be structured such that upon movement of the cutting means into the engaged orientation, the cutting end 33 will extend through both the first and second material films 15 and 16 in order to form identical overlying geometrically shaped members 17.

In the first embodiment of the cutting means 20, the base panel 25 will include a smooth tempered metal plate which is contacted by the perforator segments 32. In a second embodiment of the cutting means 20', however, the base panel 25 will include a plurality of recesses 26 disposed therein in corresponding, confronting relation with the plurality of perforator segments 32 which extend from the cutter panel 30. The recesses are positioned such that the cutter end 33 of the perforator segment 32 will pass into the recess 26 when the cutting means 20', are in their engaged orientation. Further, as illustrated in the figures, a notch 34 will preferably be formed in the cutting end 33, the notch 34 corresponding the lip 19 which will remain uncut in order to secure the geometrically shaped members 17 to their respective material films 15 and 16. Also in the second embodiment of the cutting means 20', a plurality of biased press members 35 will be disposed about the perforator segments 32. Specifically, the biased press members 35 will be positioned such that when the cutting means 20' are moved into the engaged orientation, a flat press portion 36 thereof will push the dual layer sheet 12 into fixed secured position against a main upper face 28 of the base panel 25. Further, the biased press members 35, which will preferably include a spring 37, will engage the dual layer sheet 12 and push it against the base panel 25 prior to the perforator segment 32 contacting the dual layer sheet 12, thereby ensuring that slippage during cutting does not take place.

In a third embodiment of the cutting means 20", the first and second material films 15 and 16 are brought together from individual rolls to form the dual layer sheet 12, and are passed along the surface of a base member 40. Preferably, this base member 40 will include a base roller 44 which will rotate with the passage of the dual layer sheet 12 thereover and will be formed with a smooth tempered metal surface. Disposed in confronting relation with the base roller 40, of this third embodiment of the cutting means 20", is a cutter roller 46. The cutter roller 46 will include a plurality of perforator members 47 disposed about an exterior surface thereof. The perforator members 47 will be disposed in an array which will correspond the array of geometric shapes to be formed within the dual layer sheet 12. Accordingly, as the dual layer sheet 12 passes over the base roller 40, the cutter roller 46 will rotate in a direction opposite to the rotation of the base roller pressing the dual layer sheet 12 between the respective rollers 40 and 46 and forming the array of geometrically shaped cutouts within the dual layer sheet 12. Additionally, and in order to ensure proper pushed contact between the cutter roller 46 and base roller 40, at least one of the rollers, and preferably the base roller 40, will include biasing means to bias the roller towards one another. The biasing means will preferably be in the form of a piston 43 and spring 42 which will normally urge the base roller 40 towards the cutter roller 46.

Once exiting the cutting means 20, the dual layer sheet 12 can be rolled for transfer to a separate station or can be fed directly into cutout raising means 50. Specifically, the cutout raising means 50 will be structured so as to push the geometrically shaped members 17 in both the first and second material films 15 and 16 up through an upper surface 13 of the dual layer sheet 12. In particular, the geometrically shaped members 17 of the second material film 16 will be pushed through the overlying geometrically shaped apertures 18 of the first material film 15, in turn raising the overlying geometrically shaped member 17 of the first material film 15. In a preferred embodiment, the cutout raising means 50 include a cogged wheel 52 including an array of protruding elements 53 which correspond the array of geometric shapes formed in the dual layer sheet 12. Accordingly, upon passage of the dual layer sheet 12 over the cogged wheel 52, the array of protruding elements 53 of the cogged wheel 52 will extend into the corresponding geometrically shaped apertures 18, pushing the geometrically shaped members 17 upward into a spaced elevated position over the upper surface 13 of the dual layer sheet 12. As a further step, if required, the cutout raising means 50 can also include a pair of opposing axles 54 and 55 disposed in close, spaced apart relation from one another wherethrough the dual layer sheet 12 will pass after passing over the cogged wheel 52. Preferably, the first axle 54 will be positioned such that it will contact a lower surface of the dual layer sheet and accordingly the dual layer sheet 12 will pass thereover further extending the geometrically shaped members 17 into a generally perpendicular orientation. Next, the dual layer sheet 12 will pass under the second axle 55, which will be substantially close to the first axle 54, such that the generally perpendicularly disposed geometrically shaped members 17 will contact the second axle 55 while the second axle 55 rolls over the upper surface 13 of the dual layer sheet 12, further moving the geometrically shaped members 17 to the generally perpendicular orientation.

Next, the apparatus 10 will include stagger means 60. These stagger means 60 will be specifically structured to contact the lower surface of the dual layer sheet 12, and accordingly, contact only the second material film 16. The stagger means 60 will contact the second material film 16 in such a manner as to slide it forward at a pace more rapid than the movement of the first material film 15. Accordingly, this will dispose the first and second material films in a staggered orientation relative to one another and will move the geometrically shaped members 17 of the second material film 16 forward within the geometrically shaped apertures 18 of the first material film 15 such that they will be in spaced apart relation from the geometrically shaped members 17 of the first material film 15. In the preferred embodiment, the stagger means 60 will be in the form of a stagger roller over which the dual layer sheet 12 will pass. The stagger roller includes a non-slip exterior surface 61 which will engage the second material film causing it to move at the rate of rotation of the stagger roller 60. When the second material film 16 is engaged by the stagger roller 60, it will move more rapidly than the first material film 15 until the geometrically shaped members 17 of the second material film 16 essentially abut a wall of the geometrically shaped apertures 18 of the first material film 15 in order to pull it along.

From the stagger stage, the dual layer sheet 12 can either be disposed into a storage bin 62 for future use, can be immediately rolled for convenient storage, or can pass straight to the next stage of manufacturing, namely the backing layer applicator means 70. The backing layer applicator means 70 are structured either to accept the feed of the dual layer sheet 12 directly from the stagger means 60, from a stored roll formed after passage through the stagger means 60, or from the storage bin 62. Specifically, the backing layer applicator means will be structured so as to secure a preferably adhesive backing material layer 75 to the lower surface 14 of the dual layer sheet 12, the lower surface 14 preferably including a lower surface of both the first and second material films. The backing material layer 75 will function to secure the first and second material films 15 and 16 in their preferred, staggered orientation relative to one another during further use of the fabric 11. Preferably, the backing layer applicator means 70 will include an applicator roller 77 whereover the backing material layer 75 will be disposed with an adhesive side of the backing material layer being exteriorly exposed so as to contact and be secured to the lower surface 14 of the dual layer sheet 12. Further, in the preferred embodiment, a confronting roller 78 may be disposed opposite the applicator roller 77 so as to flatten out the geometrically shaped members 17, facilitate adhesion of the backing material layer 75, and facilitate rolling of the entire fabric 11 onto a storage roll 80. Also, as shown in the figures, when being drawn from the storage bin 62, or a storage roller, the dual layer sheet 12 will pass through a pair of preliminary rollers 71 and 72 in order to achieve a preliminary flattening of the geometrically shaped members 17 before it passes between the applicator roller 77 and confronting roller 78, the backing material layer 75 passing to the applicator roller 77 from its own storage roll 76.

The apparatus 10 of the present invention is preferably incorporated into a method of manufacturing a sequined, textured fabric 11, the method including the steps of overlying the first material film 15 atop the second material film 16 so as to form the dual layer sheet 12, cutting a plurality of geometrically shaped cutouts into the dual layer sheet 12 so as to define a plurality of geometrically shaped members 17, secured to the material films 15 and 16 by a flexible lip 19, and a plurality of geometrically shaped apertures 18. Next, the geometrically shaped members 17 will be pushed from a lower surface 14 of the dual layer sheet 12 into a raised position above the upper surface 13 of the dual layer sheet 12, with the geometrically shaped members 17 of the second material film 16 extending through the geometrically shaped apertures 18 of the first material film 15. This step will be followed by pulling the second material film 16 relative to the first material film 15 so as to stagger the first material film 15 relative to the second material film and thereby space the geometrically shaped members 17 of the first material film 15 relative to the geometrically shaped members 17 of the second material film 16. Finally, the step of securing a backing layer to the lower surface of the dual layer sheet 12 can also be included. This step will ensure that the fabric 11 is able to withstand significant use and manipulation without becoming unraveled or shifting. During use of the fabric 11, if a shift occurs between the material films 15 and 16, the individual geometrically shaped members will overlap one another minimizing the overall attractive appearance of the fabric. Further such staggering can easily lead to ripping or separation as one material layer is pulled or pushed excessively relative to the interconnected layer.

Now that the invention has been described,

What is claimed is:

1. A method of manufacturing a sequined, textured fabric including first and a second material films, portions of the lower film protruding through the upper film, said method comprising the steps of:

overlying said first material film atop said second material film so as to form a dual layer sheet, cutting a plurality of geometrically shaped cuts into said dual layer sheet so as to define a plurality of geometrically shaped members secured to the material film by a flexible lip, pushing said geometrically shaped members of said dual layer sheet into a raised position above an upper layer of said dual layer material sheet, creating a plurality of geometrically shaped apertures, said geometrically shaped members of said second material film extending through said geometrically shaped apertures of said first material film, continuously pulling said second material film relative to said first material film so as to stagger said first material film relative to said second material film along an entire length thereof and causing said geometrically shaped members of said second material film to be disposed in spaced apart relation from said geometrically shaped members of said first material film corresponding to said geometrically shaped apertures of said first material film through which said geometrically shaped members of said second material film pass, and securing a backing layer to said lower surface of said dual layer sheet so as to form a single, elongate multi-layer panel and secure said first and said second material films of said dual layer sheet in said staggered orientation along an entire length of said elongate multi-layer panel, thereby facilitating cutting of said elongate multi-layer panel into segments of varying sizes without said first and said second material films separating from one another or from said staggered orientation.

* * * * *